United States Patent Office 3,030,597
Patented Apr. 17, 1962

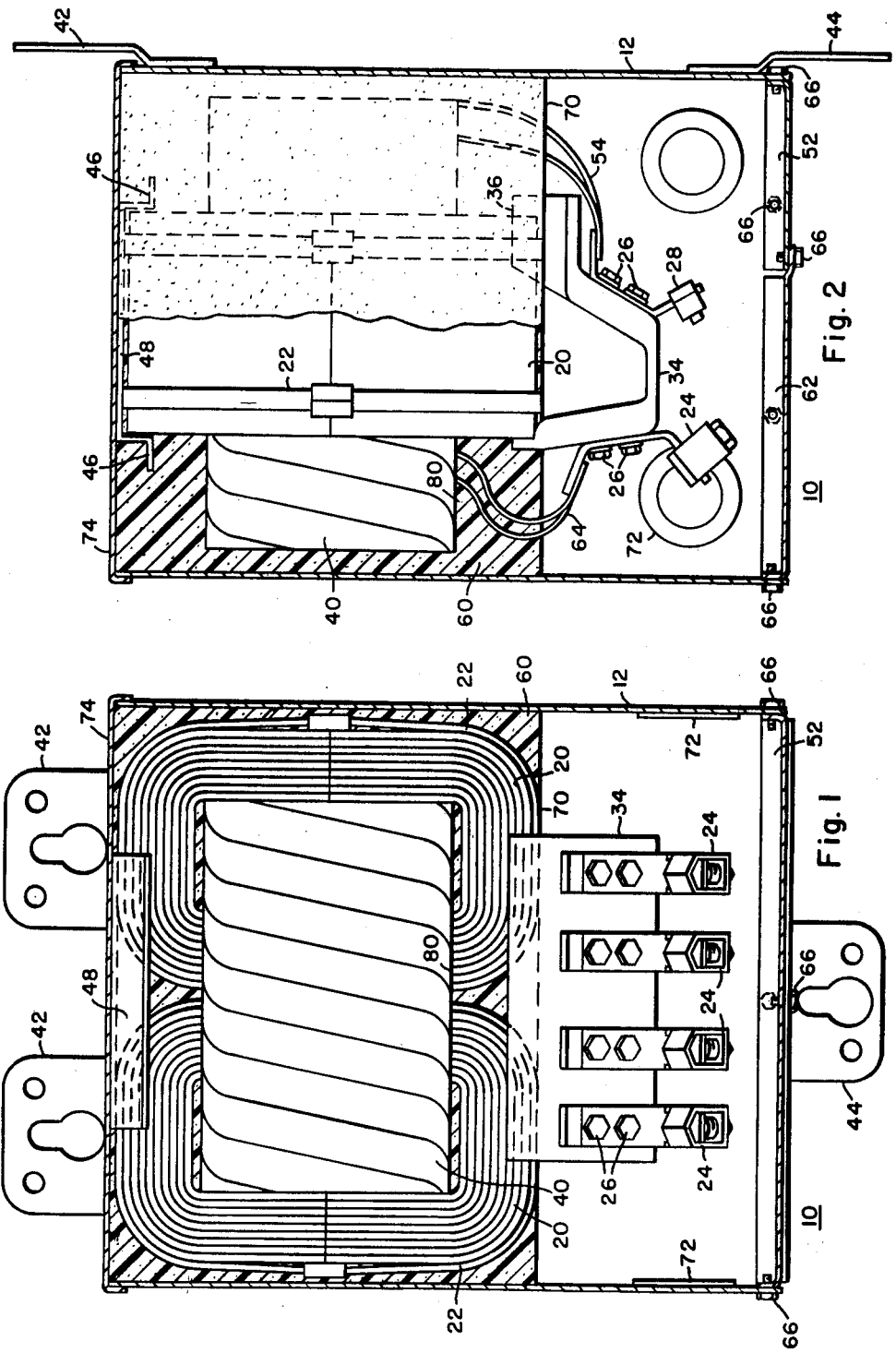

3,030,597
INSULATED ELECTRICAL APPARATUS
Carl Piaia, Jr., Greenville, and Robert M. Dieter, Hempfield, Pa., assignors to Westinghouse Electric Corporation, East Pittsburgh, Pa., a corporation of Pennsylvania
Filed Feb. 28, 1958, Ser. No. 817,345
8 Claims. (Cl. 336—92)

This invention relates to electrical apparatus, and more particularly to electrical apparatus provided with insulation comprising a mixture of certain resins and finely divided, inorganic, inert filler and to processes for producing such apparatus.

In certain types of electrical apparatus such as dry type, air-cooled transformers, a conventional construction includes a core and coil assembly secured to the inside of a casing by supporting members. The heat produced by the transformer during normal operation is dissipated through an air space which also functions as an insulating medium between the core and coil assembly and the casing of the transformer. In order to allow better circulation of air through the core and coil assembly, it is often necessary to provide said assembly with ventilating ducts which increase the necessary size and weight of the transformer. Since the air also functions as an insulating medium, it is also necessary to maintain certain minimum electrical clearances between the core and coil assembly and the casing of the transformer which also serves to increase the overall size of the transformer. It is, therefore, desirable to provide an improved construction for electrical apparatus, such as a transformer, which will include an insulating medium which will more efficiently conduct heat away from the core and coil assembly of the transformer during operation and reduce necessary electrical clearances between the parts of the transformer to thereby reduce the necessary size and weight of the transformer.

It is an object of this invention to provide a new and improved electrical apparatus provided with insulation that has a high degree of thermal conductivity.

Another object of this invention is to provide a new and improved process for producing electrical apparatus having a casing and insulation comprising a mixture of certain resins and finely divided, inorganic filler.

Other objects of the invention will, in part, be obvious and will, in part, appear hereinafter.

For a fuller understanding of the nature and objects of the invention reference should be had to the following detailed description taken in connection with the accompanynig drawing, in which:

FIGURE 1 is a view in front elevation partially in section, illustrating a transformer constructed in accordance with this invention; and FIG. 2 is a side elevation, partially in section, of the transformer shown in FIG. 1.

Referring now to the drawing and FIGURES 1 and 2 in particular, there is illustrated an inductive device, specifically a transformer 10 constructed in accordance with the teachings of this invention. In general, the transformer 10 includes a metallic casing or tank 12, having positioned or disposed theren a core and coil assembly, specifically the magnetic cores 20 on which are inductively disposed the windings 40 which include primary and secondary portions. The space between the windings 40 and the cores 20 and the casing 12 is filled with an insulating material 60 by means of which the heat generated in the windings 40 and the cores 20 is conducted to the casing 12.

In particular, the metallic casing 12 includes a top portion or plate 74 and a bottom portion, specifically the normally fixed bottom section 52 and a removable bottom section 62. The top portion 74 is secured to the walls of the casing 12 by suitable means such as welding and the bottom sections 52 and 62 are secured to the casing 12 by suitable means, specifically the self-tapping screws 66. The casing 12 also includes the upper mounting brackets 42 and the lower mounting bracket 44 which are secured to the outsde of the casing 12 by suitable means, such as weldng. In order to facilitate positioning of the cores 20 and the windings 40 when assembled inside the casing 12 and for other reasons which will be explained hereinafter, a bracket or winged channel member 48 having a recessed portion and the extending portions 46 is secured by suitable means, such as welding, to the underside of the top portion 74 of the casing 12. The casing 12 is also provided with the conventional knockouts 72 to permit the passage of electrical connections into the casing 12.

The cores 20 are of conventional type C wound construction and each of the cores 20 is provided with an associated banding strap 22 for drawing the parts of each core together. It is obvious that other types could be employed, such as stacked laminated cores. The leads 54 are connected to the primary portion of the windings 40 and the leads 64 are connected to the secondary portion of the windings 40. The leads 54 and 64 both extend outside the insulating material 60 into the space below the cores 20 and the windings 40 inside the casing 12.

The terminal block 34 is composed of a thermosetting resin and is positioned at the lower end of the cores 20, partially embedded in the insulating material 60. The terminal block 34 includes a raised or projecting portion 36 which is adapted to fit between the lower ends of the cores 20 in order to insure proper positioning of the terminal block 34 during the assembly of the transformer 10. The transformer 10 is provided with the primary terminals 28 and the secondary terminals 24 which are secured to the terminal block 34 by suitable means, specifically the self-tapping screws 26. The primary leads 54 are secured to the primary terminals 26 and the secondary leads 64 are secured to the secondary terminals 24 by suitable means, such as brazing. The terminals or connectors 24 and 28 are of conventional clamp type construction. An example of material which may be used in making the terminal block 34 is glass reinforced polyester resin. The bottom section 62 of the casing 12 is made removable in order to facilitate the connection of any electrical circuit conductors (not shown) which are brought through the knockouts 72 to the terminals 24 and 28.

In general, the insulating material 60 comprises a mixture of certain types of solventless, thermosetting resins such as those of the epoxy type, the polyester type or the silicone type and certain finely divided, inorganic, non-friable, inert fillers. Plasticizers may be added to the resins to provide for more elastic products. The resins employed in the mixture are converted to a thermosetting state as will be described hereinafter. The insulating material 60 then forms a solid mass with the cores 20, the windings 40, and the bracket member 48, the bonding action between the insulating material 60 and the cores 20 and the windings 40 and the bonding action between the insulating material 60 and the casing 12 and the bracket member 48 serving to support the cores 20 and the windings 40 inside the casing 12. The bonding action between the insulating material 60 and the terminal block 34 also serves to support the terminal block 34 and prevent any movement of the terminal block 34 inside the casing 12.

The filler material which may be employed in accordance with this invention comprises at least one inert, finely divided, non-friable, inorganic filler selected from the group consisting of silica, silicates, alumina, and bishydrated alumina. Specific examples of such fillers include sand, porcelain, aluminum silicate, mica powders, magnesium silicate, glass, aluminum oxide and aluminum oxide in the form of its mono-, di-, or trihydrate. These filler materials may be used singly or in any combination of two or more. Satisfactory crack-free insulation is obtained in accordance with this invention only when these filler materials are employed in a size such that substantially all the particles will pass through a sieve having 8 to 10 meshes per lineal inch and substantially all will be retained on a sieve having 100 meshes per lineal inch. Fillers of an average size of 40 mesh have given good results. It is desirable that the particles be rigid and non-friable whereby they will not break up into smaller particles during use.

The resinous polymeric epoxides, also known as glycidyl polyethers, employed in accordance with the present invention may be prepared by reacting predetermined amounts of at least one polyhydric phenol and at least one epihalohydrin in an alkaline medium as described in U.S. Patent 2,733,043 which issued December 4, 1956, on an application of F. J. Zukas and is assigned to the assignee of the present application. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bisphenol "A"), 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges, such for example, as 4,4'-dihydroxy-diphenyl-sulfone.

While it is preferred to use epichlorohydrin as the epihalohydrin in the preparation of the resinous polymeric epoxide starting material which may be employed in the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the average number of 1,2-epoxy groups

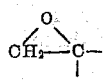

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

Resinous polymeric epoxides or glycidyl polyethers of the type suitable for use in accordance with this invention may be prepared by admixing and reacting from one to two mol proportions of epihalohydrin, preferably epichlorohydrin, with about one mol proportion of bisphenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed initially and then the epichlorohydrin added thereto, or an aqueous solution of the alkali and bis-phenol "A" may be added to the epichlorohydrin. In any case, the mixture is heated in the vessel to a temperature within the range of about 80° C. to 110° C. for a period of time varying from about one-half hour to three hours, or more depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

Examples of catalysts and co-reactive components which may be used with the above resinous polymeric epoxides in accordance with the preferred practice of this invention are dicyandiamide; triethanolamine borate; m-phenylenediamine; diphenylamine; melamine; quinoline; urea and substituted ureas such as the alkyl ureas having from 1 to 5 carbon atoms in each alkyl radical of which there may be from 1 to 4 attached to the nitrogen atoms, for instance, tetraethyl urea; guanidine and substituted guanidines having from 1 to 5 carbon atoms in each alkyl radical of which there may be from 1 to 4 attached to the nitrogen atoms of the amine groups such as symmetrical dibutyl guanidine; and dibasic acids such as maleic acid, fumaric acid, citraconic acid, phthalic acid, and anhydrides thereof, if any. The catalysts and coreactive components may be used singly or in any proper admixture of two or more and in a quantity of from 6% to 100% by weight based on 100 parts by weight of the resinous polymeric epoxide.

The polyester resin of the type which may be employed in accordance with this invention may be prepared conveniently by esterifying a polyhydric alcohol having no other reactive groups than the hydroxyl groups with a substantially molar equivalent of at least one ethylenically unsaturated alpha, beta dicarboxylic acid and anhydrides thereof as described in U.S. Patent No. 2,801,945 issued August 6, 1957, on an application of D. A. Rogers, Jr., et al. and assigned to the same assignee as the present application.

The ethylenically unsaturated alpha, beta dicarboxylic acids which may be employed in accordance with this invention include maleic acid, fumaric acid, maleic anhydride, monochloromaleic acid, itaconic acid, itaconic anhydride, citraconic acid, and citraconic anhydride. In preparing the polyester, up to 95% of the weight of the unsaturated acidic component may be replaced with one or more saturated dicarboxylic acids having from 2 to 10 carbon atoms per molecule, the carboxyl groups being located at the end of the chains and no other reactive groups being present thereon. Examples of such acids include succinic acid, adipic acid, sebacic acid, phthalic anhydride or the like.

The polyhydric alcohols which are suitable for use in preparing the polyester resin include those aliphatic alcohols having no other reactive groups than the hydroxyl groups. Examples of suitable alcohols include ethylene glycol, glycerol, pentaerythritol, propylene glycol, diethylene glycol, 1,5-pentanediol and triethylene glycol. Mixtures of polyhydric alcohols also may be employed and in some cases epoxides may be used in place of glycols, particularly in reaction with dicarboxylic acids instead of their anhydrides. Castor oil also may be employed in reactions with maleic anhydride. The polyhydric alcohol should be employed, with respect to the total amount of the acidic components, in a molar equivalent, ±10%.

The polyester resins are prepared by reacting the acidic components and the polyhydric alcohol in accordance with usual esterification procedures. For example, the acidic components and the polyhydric alcohol are heated under reflux in the presence of an esterification catalyst such as hydrochloric acid, sulphuric acid, benzene sulfonic acid or the like. Removal of water formed in the reaction to increase the degree of esterification may advantageously be effected by utilizing azeotropic distillation as, for example, by carrying out the reaction in the presence of a volatile organic liquid such as toluene, xylene or the like.

Examples of catalysts which may be used in preparing the polyester resin are benzoyl peroxide, lauroyl peroxide, methyl ethyl ketone peroxide, t-butyl hydroperoxide, ascaridole, tertbutyl perbenzoate, di-ti-butyl diperphthalate, ozonides, and similar catalysts in an amount of from 0.1% to 2% by weight, based on the total weight of the impregnating composition, although somewhat larger or smaller amounts may be employed if desired. Polymerization accelerators, such as cobalt naphthenate and azomethines, also may be admixed with the monomers and the catalysts in the impregnating composition.

An example of a silicone resin prepared by curing certain liquid polysiloxanes which may be employed in accordance with this invention is described in U.S. Patent 2,813,047 issued November 12, 1957, on an application of W. A. Ernst et al. and assigned to the same assignee as the present application.

The liquid polysiloxanes are compounds comprising essentially silicon atoms connected to each other by oxygen atoms through silicon-oxygen linkages, having an R to Si ratio from 1.98 to 2.25, and have the following recurring group:

$$-\underset{\underset{R}{|}}{\overset{\overset{R}{|}}{Si}}-O-$$

wherein R represents monovalent organic radicals selected from the group consisting of alkyl radicals having not more than four carbon atoms and phenyl, tolyl, and xylyl radicals, at least 50% being alkyl groups. These liquid compositions may include some cyclic silicones.

Good results may be secured with silicones in which the majority, if not all, of the monovalent organic radicals are methyl radicals. A gum having a minor proportion of phenyl radicals preferably present as phenyl-methyl silicon-oxide groups

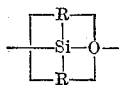

or diphenyl silicon-oxide groups

give good results. Similar results also are obtained when tolyl or xylyl radicals are substituted for the phenyl radicals.

The siloxane elastomer may be prepared by hydrolyzing a dialkyl silane or a mixture of a dialkyl and a diphenyl silane, the silanes containing an average of approximately two readily hydrolyzable groups per silicon atom. Typical readily hydrolyzable groups are halogens, for example, chlorine or fluorine and alkoxides, for example, methoxy and ethoxy, and amino groups. While it is preferred that the alkyl groups attached to silicon be entirely methyl, because of the outstanding qualities of dimethyl siloxane elastomers, other monovalent hydrocarbon groups, such as ethyl, propyl, and the like, may be present.

Upon hydrolysis of the dialkyl silane or mixed dialkyl silane and diaryl silane there results oily silicone type polymers in which a majority of the units have the structure $$-\underset{\underset{R}{|}}{\overset{\overset{R}{|}}{Si}}-O-$$

These oily siloxane polymers, for example, a dimethyl silicone oil, may be treated with various agents to convert them to high viscosity liquid silicones. Suitable examples of such agents include ferric chloride, concentrated sulfuric acid, sulfuryl chloride, sulfuryl bromide, sulfuryl fluoride, phenyl phosphoryl dichloride, and alkoxy dihalides. The high viscosity liquids also may be produced in other known ways, as by treating the oils with an acyl peroxide.

It is desirable to add finely divided fillers to the silicone oils or to the high viscosity liquid silicones before converting the same to elastomers to increase their thixotropic properties. Heat resistant inorganic compounds are preferred for this purpose. Examples thereof include asbestos, clay, barium titanate, iron oxide, bentonite, zinc oxide, lithopone, titania, magnesia, graphite, slate, mica, diatomaceous earth, calcium carbonate, lead oxide, alumina, and calcium silicate.

Acyl peroxides suitable for converting the siloxane oils, gums or gels to elastomers contain at least one aromatic acyl radical. Examples of such peroxides are benzoyl peroxide, benzoyl acetyl peroxide, dinaphthoyl peroxide, and benzoyl lauryl peroxide. The acyl radical in such peroxides may contain in inorganic substituent such, for example, as a halogen or a nitro group. The amount of acyl peroxide employed to convert a silicone liquid to an elastomer ordinarily need not exceed 10% of the weight of the silicone with 2% to 4% generally being sufficient. If the liquid siloxane is of such a high viscosity as to render its application to members difficult, it may be thinned to the desired viscosity by the addition of an organic solvent such as toluene, hexane, or the like.

The process for producing electrical apparatus such as the transformer 10 in accordance with the teachings of this invention will now be described. Broadly the process includes the steps of (1) securing the bracket member 48 to the inside of the casing 12, specifically to the underside of the top portion 74; (2) positioning the core and coil assembly, specifically the cores 20 and the windings 40, with the upper end of said cores disposed in the recessed portion of the bracket member 48 inside the casing 12 in a desired position during the subsequent application of the insulating material 60; next (3) a suitable liquid resin of one of the types previously described, having a low viscosity, is introduced into the casing 12 to a predetermined level with the casing 12 in a position inverted from that shown in FIG. 1, that is, with the top portion 74 temporarily functioning as the bottom of a container which is formed by the sides of the casing 12 and the top portion 74. Thereafter (4) finely divided inorganic filler is introduced into the casing 12 until the level of the mixture reaches substantially to the top of the windings 40 as indicated at 80. The casing 12 is then (5) vibrated at a gradually increasing rate or frequency until the resin appears to have impregnated the windings 40 and substantilly filled all the open space or voids in the cores 20 and the windings 40. During the vibrating of the casing 12, after the windings 40 appear to be completely impregnated, the balance of the filler is added until the level of the mixture reaches substantially to the top of the cores 20 as indicated at 70 in FIGS. 1 and 2. Before the core and coil assembly, including the windings 40 and the cores 20, is positioned in the casing 12, the terminal block 34 is positioned as illustrated in FIGS. 1 and 2 so that the final level of the insulating material 60 is such as to partially embed the terminal block 34. The potted transformer 10 then (6) is placed in an oven or heating device or current passed through the member to bring it to a predetermined temperature for a period of time sufficient to cure the insulating material 60 to a tough, hard solid.

After the insulating material 60 has been cured, it is assumed that the bottom sections 52 and 62 of the casing 12 are assembled in place and secured to the casing 12 by means of the screws 66.

A preliminary step may be added to the above process if the closed end of the casing 12 such as the top portion 74 is not completely sealed or leakproof. In the latter case, a small amount of the thermosetting resin may be introduced into the casing 12 at the closed end of the casing 12 which is to be sealed and a small amount of filler also introduced before the cores 20 and the windings 40 are positioned inside the casing 12. A fast setting catalyst, such as diethylene triamine, is then added to cause the small amount of resin and filler to be cured and to seal the closed end of the casing 12.

The casing 12 is preferably placed on a suitable vibrating device (not shown) and vibrated for a few minutes to insure settling of the finely divided filler during the process described so as to substantially fill all the open space or voids in the windings 40 and the cores 20 after the resin and filler have been introduced as described above. It is to be understood that other means may be employed for compacting the mixture of resin and filler, such as placing the casing 12 under vacuum to remove all air between the particles of the filler to insure complete filling of the space around the cores 20 and the windings 40.

It is also to be understood that other means may be employed for converting the thermosetting resin to a thermosetting state. It has been found that a thermosetting resin of the epoxy type, previously described, can be cured by placing the transformer 10 in an air-circulating oven for approximately 3 hours at 125° C. Other methods of curing or polymerizing the thermosetting resin may be employed in a particular application, such as subjecting the resin to certain types of radiation.

The bracket member 48 has the extending portions 46 which are embedded in the insulating material 60 in order to provide additional support for the solid mass formed by the insulating material 60, the cores 20 and the windings 40. The bracket member 48 serves to prevent separation of the insulating mass 60 from the inside of the casing 12. It is to be understood that the bracket member 48 may be constructed in other forms and mounted at a location inside the casing 12 other than that shown in FIGS. 1 and 2, such as a strip of metal welded to the inside of the casing 12 with the ends of the strip bent out and embedded in the insulating material 60.

The space between the lower level of the insulating material 60 and the bottom sections 52 and 62 of the casing 12 provides a convenient terminal chamber in which means for making any necessary terminal connections may be provided, such as the terminal block 34 and the terminals 24 and 28. It is to be understood that terminal block 34 may be eliminated by embedding any necessary terminals directly in the insulating material 60.

It has been found that an electrical apparatus such as the transformer 10 constructed in accordance with the teachings of this invention has several advantages. For example, the size of a transformer 10 of a particular rating is considerably reduced in comparison with the corresponding air-cooled transformer. The sound level of a transformer of the type disclosed is also considerably reduced. In addition, it has been found that a transformer or other inductive device incorporating the construction disclosed is substantially moisture proof and corrosion proof, as far as the insulating material is concerned. A transformer of the type disclosed may also be mounted in any position either as shown in FIGS. 1 and 2 or in an inverted position.

Since numerous changes may be made in the above described apparatus and process and different embodiments of the invention may be made without departing from the spirit thereof, it is intended that all the matter contained in the foregoing description or shown in the accompanying drawing shall be interpreted as illustrative and not in a limiting sense.

We claim as our invention:

1. In an electrical inductive device having at least one winding with its associated leads disposed on a magnetic core, the combination comprising a metallic casing having a top portion, a bracket member having a recessed portion secured to the underside of said top portion of said casing, said core and winding being positioned in said casing with the upper end of said core disposed in the recessed portion of said bracket member, insulating material filling the space between said core and winding and said casing from said top portion substantially to the bottom end of said core, said insulating material comprising a mixture of finely divided, inorganic, non-friable, inert filler and cured thermosetting resin, said core and winding being supported by the bond between said insulating material and said casing and the bond between said insulating material and said core and windings, the sole mechanical connection between said core and winding and said casing and between said core and winding and said bracket member being the bond between said insulating material and said core and winding and between said insulating material and said casing and said bracket member, said bracket member being embedded in said insulating material to assist in positioning said core in said casing during assembly and to prevent separation of said casing and said insulating material.

2. In an electrical inductive device having at least one winding with its associated leads disposed on a magnetic core, the combination comprising a casing having a top portion, a bracket member having a recessed portion secured to the underside of said top portion of said casing, said core and winding being positioned in said casing with the upper end of said core disposed in the recessed portion of said bracket member, insulating material filling the space between said core and winding and said casing from said top portion substantially to the bottom end of said core, said core and winding being free to move in at least one predetermined direction with respect to said bracket member in the absence of said insulating material, said insulating material comprising a mixture of finely divided, inorganic, non-friable, inert filler and cured thermosetting resin, said core and winding being supported within said casing by the bond between said insulating material and said casing and the bond between said insulating material and said core and windings, said bracket member being embedded in said insulating material to prevent separation of said casing and said insulating material, a terminal block of thermosetting resin disposed at the bottom end of said core and partially embedded in said insulating material, said block being held in place solely by the bonding action between said block and said insulating material and a set of terminals connected to said leads and secured to said block.

3. In an electrical inductive device having at least one winding with its associated leads disposed on a magnetic core, the combination comprising a casing having a top portion and a bottom portion, a bracket member having a recessed portion secured to the underside of said top portion, said core and winding being positioned in said casing with the upper end of said core disposed in the recessed portion of said bracket member, said bracket member and said casing being shaped to permit relative movement of said core and winding in at least one direction, insulating material filling the space between said core and winding and said casing from said top portion substantially to the bottom end of said core to provide space between said insulating material and the bottom portion of said casing, with the ends of said leads extending beyond said insulating material, said insulating material comprsing a mixture of finely divided, inorganic, non-friable, inert filler and cured thermosetting resin, said core and winding being supported within said casing by the bond between said insulating material and said casing and the bond between said insulating material and said core and windings, said bracket member being embedded in said insulating material to assist in positioning said core and winding inside said casing during assembly and to prevent separation of said casing and said insulating material and terminal connecting means connected to said leads and disposed in the space between the bottom end of said core and the bottom portion of said casing.

4. A transformer comprising at least one winding with its associated leads disposed on a magnetic core, a casing having a top portion, a bracket member having a recessed portion and extending portions secured to the underside of said top portion of said casing, said core and winding being freely positioned in said casing with respect to said bracket member and disposed with the upper end of said core in the recessed portion of said bracket member, insulating material filling the space between said core and winding and said casing from said top portion substantially to the bottom end of said core, said insulating material comprising a mixture of finely divided, inorganic, non-friable, inert filler and cured thermosetting resin, said core and winding being supported within said casing by the bond between said insulating material and said casing and the bond between said insulating material and said core and windings, the extending portions of said bracket member being embedded in said insulating material to prevent separation of said casing and said insulating material.

5. In electrical inductive apparatus having at least one winding inductively disposed on a magnetic core, the combination comprising a metallic casing having an end portion, said core and winding being disposed inside said casing, insulating material partially filling the space between said core and winding and said casing to a predetermined level, said insulating material comprising a mixture of finely divided inorganic, non-friable, inert filler and cured thermosetting resin, said core and winding and said insulating material forming a solid mass which bonds to said casing to support said core and winding, and a locking member having a recessed portion attached to the inside of the end portion of said casing and having a projecting portion extending inwardly into said insulating material to prevent relative movement of said solid mass and said casing, one end of said core being disposed in the recessed portion of said locking member, the parts of the complete transformer other than said insulating material being shaped to permit predetermined movement of said core and winding with respect to said casing and locking member.

6. In electrical inductive apparatus having at least one winding inductively disposed on a magnetic core, the combination comprising a metallic casing having an end portion, said core and winding being disposed inside said casing, insulating material filling the space between said core and winding and said casing to a predetermined level, said insulating material comprising a mixture of finely divided inorganic, non-friable, inert filler and cured thermosetting resin, said core and winding and said insulating material forming a solid mass which bonds to said casing to support said core and winding within said casing, a locking member having a recessed portion in which one end of said core is disposed, said member being rigidly fastened to the interior of the end portion of said casing and having an extending portion at least partially enclosing a portion of said insulating material to prevent separation of said solid mass and said casing, the only structural connection between said core and winding and said casing and between said core and winding and said locking member being the bond between said insulating material and said core and winding and between said insulating material and said casing and said locking member.

7. In an electrical inductive device having at least one winding with its associated leads disposed on a magnetic core, the combination comprising a casing having a top portion, a supporting member having a recessed portion secured to the underside of said top portion of said casing, said core and winding being positioned in said casing with the upper end of said core disposed in the recessed portion of said supporting member, insulating material filling the space between said core and winding and said casing from said top portion substantially to the bottom end of said core to provide space between the bottom of said core and the bottom of said casing, said insulating material comprising a mixture of finely divided, inorganic non-friable, inert filler and cured thermosetting resin, said core and winding being supported within said casing by the bond between said insulating material and said casing and the bond between said insulating material and said core and windings, said supporting member being embedded in said insulating material to prevent separation of said casing and said insulating material, a terminal block of thermosetting polyester resin disposed at the bottom end of said core and partially embedded in said insulating material, said block being only held in place by the bonding action between said block and said insulating material and having a portion extending outwardly beyond said insulating material into said space and a set of terminals connected to said leads and secured to the extending portion of said block, the parts of the complete transformer other than said insulating material being shaped to permit predetermined movement of said core and winding with respect to said casing and said supporting member.

8. In an electrical inductive device having at least one winding with its associated leads disposed on a magnetic core, the combination comprising a casing having a top portion and a bottom portion, a locking member having a recessed portion secured to the underside of said top portion, said core and winding being positioned in said casing with the upper end of said core disposed in the recessed portion of said locking member, insulating material filling the space between said core and winding and said casing from said top portion substantially to the bottom end of said core to provide a space between the bottom of said core and the bottom of said casng, the ends of said leads extending beyond said insulating material into said space, said insulating material comprising a mixture of finely divided, inorganic, non-friable, inert filler and cured thermosetting resin, said core and winding being supported by the bond between said insulating material and said casing and the bond between said insulating material and said core and windings, said locking member being embedded in said insulating material to prevent separation of said casing and said insulating material and to assist in positioning said core and winding in said casing during assembly, and terminal connecting means connected to said leads and disposed in the space between the bottom end of said core and the bottom portion of said casing the only mechanical connection between said core and winding and said casing and between said core and winding and said locking member being the bond provided by said insulating material.

References Cited in the file of this patent

UNITED STATES PATENTS

| | | |
|---|---|---|
| 2,484,215 | Foster | Oct. 11, 1949 |
| 2,724,869 | Merrill et al. | Nov. 29, 1955 |
| 2,753,533 | Houser | July 3, 1956 |
| 2,775,742 | Bogue | Dec. 25, 1956 |
| 2,788,499 | Pappas | Apr. 9, 1957 |
| 2,795,009 | Gosnell et al. | June 11, 1957 |
| 2,823,362 | Geroulo et al. | Feb. 11, 1958 |
| 2,897,463 | Denham | July 28, 1959 |

UNITED STATES PATENT OFFICE

CERTIFICATE OF CORRECTION

Patent No. 3,030,597                                 April 17, 1962

Carl Piaia, Jr., et al.

It is hereby certified that error appears in the above numbered patent requiring correction and that the said Letters Patent should read as corrected below.

In the heading to the printed specification, line 6, for "Ser. No. 817,345" read -- Ser. No. 718,345 --.

Signed and sealed this 20th day of November 1962.

(SEAL)
Attest:

ERNEST W. SWIDER
Attesting Officer

DAVID L. LADD
Commissioner of Patents